(12) United States Patent
Rosenbaum et al.

(10) Patent No.: US 12,147,997 B1
(45) Date of Patent: Nov. 19, 2024

(54) SENSOR DATA COLLECTION AND PROCESSING

(71) Applicant: Vale Group LLC, Seattle, WA (US)

(72) Inventors: Omer Rosenbaum, Kirkland, WA (US); Richard Earl Simpkinson, Issaquah, WA (US); Rusty Allen Gerard, Bothell, WA (US); Shamyl Emrich Zakariya, Seattle, WA (US)

(73) Assignee: Vale Group LLC, Seattle, WA (US)

( * ) Notice: Subject to any disclaimer, the term of this patent is extended or adjusted under 35 U.S.C. 154(b) by 22 days.

(21) Appl. No.: 16/855,903

(22) Filed: Apr. 22, 2020

Related U.S. Application Data

(60) Provisional application No. 62/837,666, filed on Apr. 23, 2019.

(51) Int. Cl.
| | |
|---|---|
| G06Q 30/02 | (2023.01) |
| G01D 21/02 | (2006.01) |
| G01P 13/00 | (2006.01) |
| G01P 15/02 | (2013.01) |
| G01S 19/01 | (2010.01) |

(Continued)

(52) U.S. Cl.
CPC .......... *G06Q 30/0208* (2013.01); *G01D 21/02* (2013.01); *G01P 13/00* (2013.01); *G01P 15/02* (2013.01); *G01S 19/01* (2013.01); *H04Q 9/00* (2013.01)

(58) Field of Classification Search
CPC .... G06Q 30/0208; G01D 21/02; G01P 13/00; G01P 15/02; G01S 19/01; H04Q 9/00
See application file for complete search history.

(56) References Cited

U.S. PATENT DOCUMENTS

| | | | |
|---|---|---|---|
| 6,080,063 A | 6/2000 | Khosla | |
| 8,384,542 B1 * | 2/2013 | Merrill | G08B 25/01 340/541 |
| 9,317,916 B1 | 4/2016 | Hanina et al. | |

(Continued)

FOREIGN PATENT DOCUMENTS

| | | |
|---|---|---|
| CN | 107897068 A | 4/2018 |
| JP | 2017093425 A | 6/2017 |

(Continued)

OTHER PUBLICATIONS

Charles, GPS Goes Mainstream, Dec. 26, 2007, https://www.npr.org/templates/story/story.php?storyId=17611103, pp. 1-7) which discloses that GPS sensor in computers became mainstream in at least 2007 (Year: 2007).*

(Continued)

*Primary Examiner* — John Van Bramer
(74) *Attorney, Agent, or Firm* — Davis Wright Tremaine LLP

(57) ABSTRACT

A technique for collecting environmental data from a remote region comprises use of a collector device with a sensor to collect environmental data and a memory to store the collected data. Collector devices are distributed to locations within the region, and the collector devices collect and store environmental data. Locations within the region are prioritized. Incentives are generated to transport environmental data based, at least in part, on the priorities. When a collector device is transported from the remote region to a location with connectivity to a host system, the stored environmental data is uploaded.

20 Claims, 6 Drawing Sheets

(51) Int. Cl.
*G06Q 30/0208* (2023.01)
*H04Q 9/00* (2006.01)

(56) References Cited

U.S. PATENT DOCUMENTS

| | | | |
|---|---|---|---|
| 9,782,668 | B1 | 10/2017 | Golden et al. |
| D817,195 | S * | 5/2018 | Iyengar .................. D10/46 |
| 10,143,925 | B2 | 12/2018 | Middleton |
| 10,192,126 | B2 | 1/2019 | Yamanaka et al. |
| 10,279,264 | B1 | 5/2019 | Aghdaie et al. |
| 10,579,869 | B1 | 3/2020 | Xiong et al. |
| 10,675,536 | B2 | 6/2020 | Chen |
| 10,839,203 | B1 | 11/2020 | Guigues et al. |
| 10,989,815 | B2 | 4/2021 | Dmitriev et al. |
| 11,036,303 | B2 | 6/2021 | Rani et al. |
| 11,132,606 | B2 | 9/2021 | Taylor |
| 11,249,179 | B2 | 2/2022 | Hamasaki et al. |
| 11,337,358 | B2 | 5/2022 | Fletcher et al. |
| 2003/0142587 | A1 | 7/2003 | Zeitzew |
| 2006/0223635 | A1 | 10/2006 | Rosenberg |
| 2008/0170123 | A1 | 7/2008 | Albertson et al. |
| 2008/0176583 | A1 | 7/2008 | Brachet et al. |
| 2009/0005140 | A1 | 1/2009 | Rose et al. |
| 2010/0156660 | A1 | 6/2010 | Lee et al. |
| 2011/0216060 | A1 | 9/2011 | Weising et al. |
| 2011/0298827 | A1 | 12/2011 | Perez |
| 2011/0301934 | A1 | 12/2011 | Tardif |
| 2012/0079990 | A1 | 4/2012 | Fuhr et al. |
| 2012/0083325 | A1 | 4/2012 | Heatherly |
| 2012/0281181 | A1 | 11/2012 | Chen et al. |
| 2013/0077820 | A1 | 3/2013 | Marais et al. |
| 2013/0261856 | A1 | 10/2013 | Sharma et al. |
| 2014/0032034 | A1 | 1/2014 | Raptopoulos et al. |
| 2014/0153794 | A1 | 6/2014 | Varaklis et al. |
| 2014/0253590 | A1 | 9/2014 | Needham et al. |
| 2014/0267008 | A1 | 9/2014 | Jain et al. |
| 2014/0310595 | A1 | 10/2014 | Acharya et al. |
| 2015/0177842 | A1 | 6/2015 | Rudenko |
| 2016/0078289 | A1 | 3/2016 | Michel et al. |
| 2016/0086349 | A1 | 3/2016 | Shotton et al. |
| 2016/0180468 | A1 | 6/2016 | Buss et al. |
| 2016/0243434 | A1 | 8/2016 | Yim et al. |
| 2016/0328604 | A1 | 11/2016 | Bulzacki |
| 2017/0144756 | A1 | 5/2017 | Rastgaar Aagaah et al. |
| 2017/0148339 | A1 | 5/2017 | Van Curen et al. |
| 2017/0168586 | A1 | 6/2017 | Sinha et al. |
| 2017/0190051 | A1 | 7/2017 | O'Sullivan et al. |
| 2017/0193708 | A1 | 7/2017 | Lyons et al. |
| 2017/0208493 | A1 * | 7/2017 | Masson .................. H04L 67/12 |
| 2017/0212210 | A1 * | 7/2017 | Chen .................. G01S 5/0226 |
| 2017/0227638 | A1 | 8/2017 | Nicoletti et al. |
| 2017/0234966 | A1 | 8/2017 | Naguib et al. |
| 2017/0280678 | A1 | 10/2017 | Jones et al. |
| 2017/0293742 | A1 | 10/2017 | Sadeghi et al. |
| 2017/0293824 | A1 | 10/2017 | Chen et al. |
| 2017/0313421 | A1 | 11/2017 | Gil |
| 2017/0344859 | A1 | 11/2017 | Mo |
| 2017/0358144 | A1 | 12/2017 | Schwarz et al. |
| 2018/0018861 | A1 | 1/2018 | Locke et al. |
| 2018/0020329 | A1 | 1/2018 | Smith |
| 2018/0024641 | A1 | 1/2018 | Mao et al. |
| 2018/0093186 | A1 | 4/2018 | Black et al. |
| 2018/0122043 | A1 | 5/2018 | Energin et al. |
| 2018/0213713 | A1 | 8/2018 | Zito, Jr. et al. |
| 2018/0263170 | A1 | 9/2018 | Aghai et al. |
| 2018/0310532 | A1 | 11/2018 | Hickson et al. |
| 2018/0330810 | A1 | 11/2018 | Gamarnik et al. |
| 2019/0000350 | A1 | 1/2019 | Narayan et al. |
| 2019/0038222 | A1 | 2/2019 | Krimon et al. |
| 2019/0061890 | A1 | 2/2019 | Fiorello |
| 2019/0091582 | A1 | 3/2019 | Reiche, III et al. |
| 2019/0124893 | A1 | 5/2019 | Bolen |
| 2019/0217198 | A1 | 7/2019 | Clark et al. |
| 2019/0221035 | A1 | 7/2019 | Clark et al. |
| 2019/0294881 | A1 | 9/2019 | Polak et al. |
| 2019/0325605 | A1 | 10/2019 | Ye et al. |
| 2019/0383903 | A1 | 12/2019 | Chao et al. |
| 2020/0005028 | A1 | 1/2020 | Gu |
| 2020/0050342 | A1 | 2/2020 | Lee |
| 2020/0055570 | A1 | 2/2020 | Brink et al. |
| 2020/0057425 | A1 | 2/2020 | Seibert et al. |
| 2020/0160535 | A1 | 5/2020 | Ali Akbarian et al. |
| 2020/0234231 | A1 | 7/2020 | Stevenson et al. |
| 2020/0238177 | A1 | 7/2020 | Black et al. |
| 2020/0284903 | A1 | 9/2020 | Zach et al. |
| 2020/0289922 | A1 | 9/2020 | McCoy et al. |
| 2020/0394393 | A1 | 12/2020 | Kraft et al. |

FOREIGN PATENT DOCUMENTS

| | | |
|---|---|---|
| KR | 20170139093 A | 12/2017 |
| WO | 2017132563 A1 | 8/2017 |

OTHER PUBLICATIONS

Langley, Approaches to Machine Learning, Feb. 16, 1984, Department of Computer Science Carnegie-Mellon University, pp. 1-28 (Year: 1984).*

International Search Report and Written Opinion mailed Jul. 23, 2020, Patent Application No. PCT/US2020/016882, 19 pages.

International Invitation to Pay Additional Fees mailed Jun. 2, 2020, in International Patent Application No. PCT/US2020/016882, filed Feb. 5, 2020, 21 pages.

Kramar, V., et al., "Particularities of Visualisation of Medical and Wellness Data Through a Digitial Patient Avatar", 14th Conference of Open Innovation Association FRUCT, 2013, 12 pages.

Ocean News, "Meet RangerBot, Robot Reef Protector," Sep. 4, 2018, 7 pages.

Chamberland, et al., "New Seeding Approach Reduces Costs and Time to Outplant Sexually Propagated Corals for Reef Restoration," www.nature.com/Scientificreports, Dec. 22, 2017, 12 pages.

* cited by examiner

SENSOR DATA COLLECTION AND PROCESSING

CROSS-REFERENCE TO RELATED APPLICATIONS

This application claims the benefit of U.S. Provisional Patent Application No. 62/837,666, filed Apr. 23, 2019, the disclosure of which is herein incorporated by reference in its entirety.

BACKGROUND

Increasingly, the health of various natural environments, such as rainforests and coral reefs, is threatened by changing environmental conditions. In addition, certain events or activities may cause environmental harm. Identifying, reporting, and responding to such changes, events, and activities may be helpful in mitigating the environmental impact of these threats. However, collecting data and reporting on events occurring in natural environments that are remote or hazardous remains a challenging endeavor.

BRIEF DESCRIPTION OF THE DRAWINGS

Various techniques will be described with reference to the drawings, in which.

DETAILED DESCRIPTION

Techniques and systems described below relate to collection of data obtained from remote, isolated, or hazardous environments, and to improve reporting on conditions, events, activities, or incidents which may be observed in such environments. In at least one embodiment, a system is configured to promote the collection of sensor data obtained from such environments, even when direct communication from devices in such environments is difficult or impractical.

In at least one embodiment, a technique for collecting environmental data from a remote region comprises using a collector device with a sensor to collect environmental data and a memory to store the collected data. Collector devices are distributed to locations within the region, and the collector devices collect and store environmental data. The location may be remote or have conditions which inhibit direct communication with the collector device. To obtain the environmental data, locations within the region are prioritized. Incentives are generated and publicized to transport environmental data based on those priorities. When a collector device is transported from the remote region to a location with connectivity to a host system, the stored environmental data is uploaded.

In the preceding and following description, various techniques are described. For purposes of explanation, specific configurations and details are set forth in order to provide a thorough understanding of possible ways of implementing the techniques. However, it will also be apparent that the techniques described below may be practiced in different configurations without the specific details. Furthermore, well-known features may be omitted or simplified to avoid obscuring the techniques being described.

Figure 1:
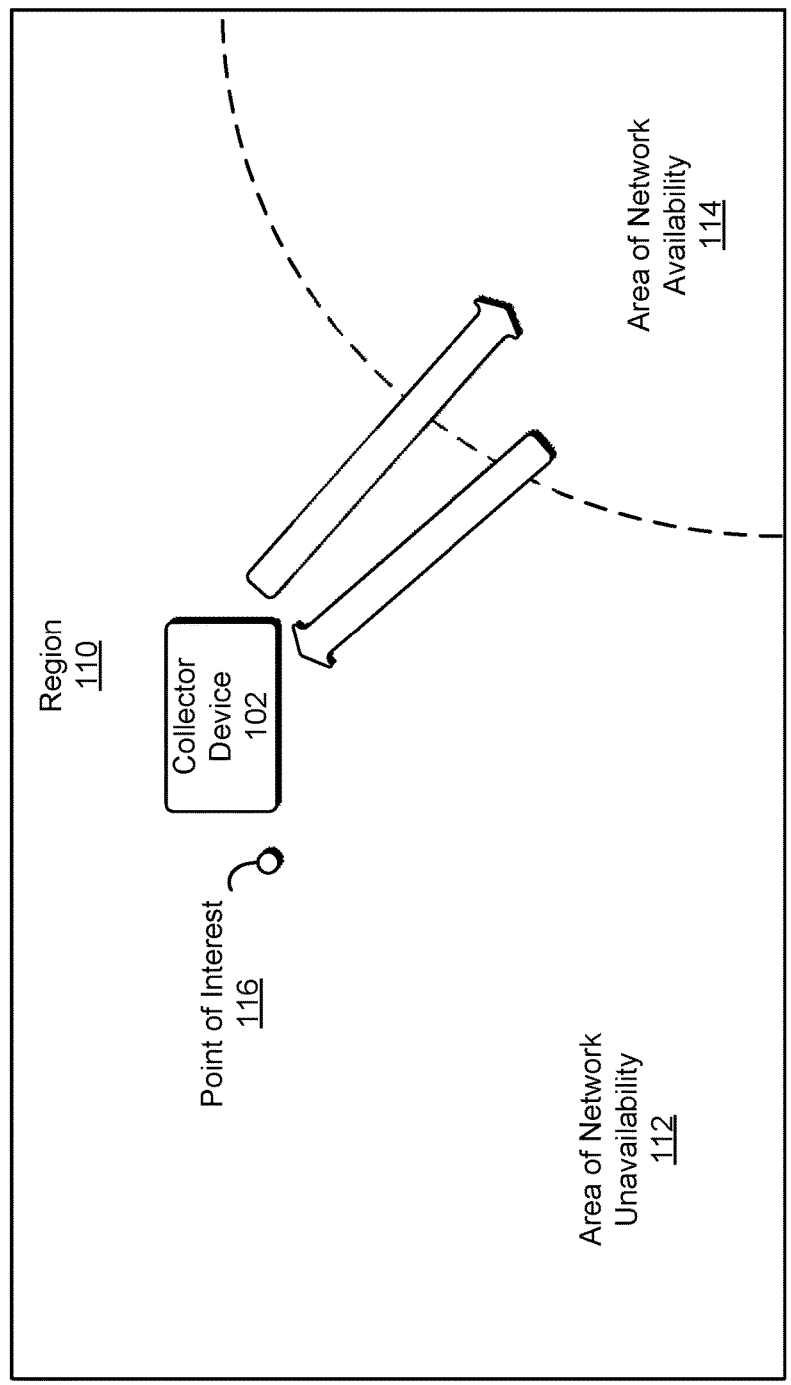
FIG. 1 illustrates example operation of a sensor data collector device, in accordance with an embodiment.

Techniques described and suggested in the present disclosure improve various technological fields, including those related to the collection to environmental data. In at least one embodiment, data collection is improved by devices that obtain and store sensor FIG. 1 illustrates example operation of a sensor data collector device, in accordance with an embodiment. The example 100 depicts collection of data within a region 110 comprising an area of network availability 114 and an area of network unavailability. Note that, in at least some cases, some or all of the region 110 may be large or difficult to traverse. Examples include wilderness or underwater areas. Such areas may have limited infrastructure, such as communications infrastructure, few or no roads, and so forth. In the case of underwater areas, infrastructure may be nonexistent and conventional means of communication may be impossible. The time or other costs of entering or traversing the area may also be relatively high. For example, in cases where region 110 comprises forests, desert, or mountainous regions, travelling across region 110 may involve extensive preparation and acquisition of supplies and equipment, and in some cases there may be no feasible means of transportation other than proceeding on foot. Similarly, if region 110 is an aquatic region, equipment such as oxygen tanks and other SCUBA gear may be required to travel in the region.

In at least one embodiment, a system is designed to promote collection of environmental data in an area around a point of interest 116, where the point of interest 116 is located within an area of network unavailability 112, such that direct communication between the collector device 102 and a desired recipient of the collected information is not possible.

In at least one embodiment, a collector device 102 is pre-placed at or near point of interest 116. In other embodiments, the collector device 102 is carried to a point of interest by a user of the device 102. A user may be encouraged, through various means described herein, to use the device for some period of time, and to then deposit the collector device 102 at a point of interest 116. Another user, through various means described herein, may be encouraged to take a collector device 102 from the point of interest 116 and transport it to an area of network availability 114, where it may upload collected data.

In at least one embodiment, collector device 102 comprises one or more sensors to obtain and store data. In at least one embodiment, the sensors collect data related to environmental conditions in the area near point of interest 116. In at least one embodiment, data collected by collector device 102 comprises data concerning temperature, positioning, lighting conditions, sound levels, pollution, salinity, pH levels, and so forth.

In at least one embodiment, a collector device 102 collects data related to specific events that may occur at or near the point of interest 116. For example, collected data may pertain to animal poaching, increases in contaminant levels, changing weather conditions, earthquakes, tornadoes, wildfires, and so forth. In at least one embodiment, a collector device 102 interacts with a user, through various means described herein, while the user and device 102 are at the point of interest 116, to collect data about an event.

In an embodiment, the collector device 102 is an electronic device with at least one microprocessor and a memory that stores instructions executable by the microprocessor. The collector device 102 may further comprise one or more sensors for collecting data, and memory for storing collected data. The sensors can include cameras, global positioning system receivers, microphones, photometers, particle counters, acidity and pH level sensors, and so forth. The microprocessor may cause the system to obtain and store data collected from the sensors.

In at least one embodiment, a collector device 102 collects information without requiring user input. For example, the collector device 102 may monitor data from its sensors on a periodic basis, and store the monitored data. In at least one embodiment, such periodic collection is done for environmental data such as temperature, positioning, lighting conditions, sound levels, pollution, salinity, pH levels, and so forth.

In at least one embodiment, a collector device 102 collects information in response to an event in the environment that has been detected based on monitoring output from certain sensors. For example, in at least one embodiment, microphone data is used to detect gunshot sounds that may be indicative of illegal animal poaching. In another embodiment, temperature data is monitored to initiate collection of data at certain times of the year.

In at least one embodiment, a collector device 102 collects information based, at least partially, on user input. In at least one embodiment, a device carried by a user, such as a smartphone, communicates via a wireless network while the smartphone and collector device 102 are in proximity of each other. The collector device 102 may then interact with an application executing on the smartphone to facilitate user interaction.

For example, in at least one embodiment, a user may have observed or have knowledge of animal poaching that may have occurred near point of interest 116. The user may wish to report such information, or may be asked by the device to provide such information. In at least one embodiment, interaction between the user's device (e.g., a smartphone) and a collector device 102 is used to collect supplemental information from a visitor to the point of interest 116.

In an embodiment, the collection of data is guided by assistive technology. In at least one embodiment, the collector device 102 comprises machine learning or other artificial intelligence routines for assisting in the identification and collection of data relevant to an incident. In at least one embodiment, an artificial intelligence module classifies an observed event and initiates obtaining and storing data estimated to be relevant to the event. For example, based on monitoring of environmental data or reporting from a visitor to the point of interest 116, the collector device 102 might determine that a poaching event has occurred, and initiate collection of data estimated to be relevant to the poaching event. This might, for example, include the date and time of the event, photographs of the surrounding area, location data, and commentary by the visitor. In at least one embodiment, photographs and other assets are collected by a device controlled by the visitor, such as the visitor's smartphone.

In at least one embodiment, the collector device comprises a knowledge base to guide decision-making regarding data collection. For example, in at least one embodiment, the collector device 102 comprises an artificial intelligence module that, by incorporating a knowledge base of data concerning the local environment, detects events determined to be of importance to the local environment. The collector device 102 may respond to this determination by initiating further data collection and storage.

In at least one embodiment, the collector device 102 prompts a visitor to the point of interest 116 to provide information relevant to an event or condition being monitored. For example, in at least one embodiment, the collector device 102 initiates communication with a visitor, via a smartphone or other device connected to the collector device 102 via a local wireless network, to provide voice commentary or other input.

In at least one embodiment, the collector device 102 stores voice annotations or textual data provided by a visitor to point of interest 116. Voice or textual data, in at least one embodiment, is collected by the visitor's smartphone or other computing device, and transferred to the collector device 102.

In at least one embodiment, the collector device 102 prompts the visitor to collect information. For example, based on a classification of an event and on an understanding of what data will be needed to complete the filing of a report or an investigation into an incident or other condition, the collector device 102 may determine information that would be useful to understand or report on the event, but has yet to be collected. This technique may also be done to better understand environmental conditions or changes. In at least one embodiment, an artificial intelligence module in the collector device 102 identifies events or conditions and determines that additional information should be collected. In at least one embodiment, information to be collected is determined using a knowledge base stored within collector device 102. The collector device 102 may then interact with a visitor device, such as a cellphone, to request that additional information be provided.

In at least one embodiment, the collector device initiates a questioning process in which the visitor is asked to provide additional information or insight concerning the event or condition. The questions or requested additional information may pertain to categories determined, by the artificial intelligence module, to be relevant to the condition or event that is being investigated.

In at least one embodiment, an artificial intelligence module comprises software and/or hardware included in the collector device 102. In at least one embodiment, the software and/or hardware comprises implementations of one or more artificial neural networks or similar learning structure. In at least one embodiment, an artificial neural network, or other learning structure, is trained to recognize conditions or events of interest based on input from one or more sensors. In at least one embodiment, software instructions associated with an artificial intelligence module are executed to perform inference or classification based on a trained neural network, to identify events or conditions that may require further data collection. As described above, this data collection can then be initiated by further execution of processor-executable instructions. The data collection can comprise one or more of additional or more frequent collection of data from embedded sensors, requests for additional information sent to visitor device's, and so on.

In at least one embodiment, the collector device 102 is eventually transported from point of interest 116, in the area of network unavailability 112, to the area of network availability 114. In at least one embodiment, when the collector 102 is returned to the area of network availability 114, the collector device 102 uploads collected data to a host system for further processing. Whereas the collector device 102 is focused on data collection, the host system performs tasks related to processing this information to perform functions such as completing an incident report, completing an investigative report, and so on.

In an embodiment, the host system uses the collected sensor data, and any associated metadata (such as location data, time data, and so forth) to at least partially complete a reporting task, such as the aforementioned incident or investigative reports. For example, the host system might pre-fill certain fields relating to the time and place of the incident. Classifiers or other machine learning techniques may be applied to determine relevant facts for the report. For example, in the case of a poaching incident, the type of animal involved might be pre-filled into the report. Evidence or other information collected at the scene might be automatically attached and marked with relevant metadata, such as the time and location the evidence was collected.

In at least one embodiment, data collected is marked with a timestamp and location marker. In at least one embodiment, data collected is encrypted and signed to preserve the data's integrity by preventing unauthorized modification. This may be useful in scenarios, such as animal poaching, where subsequent legal proceedings may require collected data to be verified and a chain of custody preserved.

Figure 2:
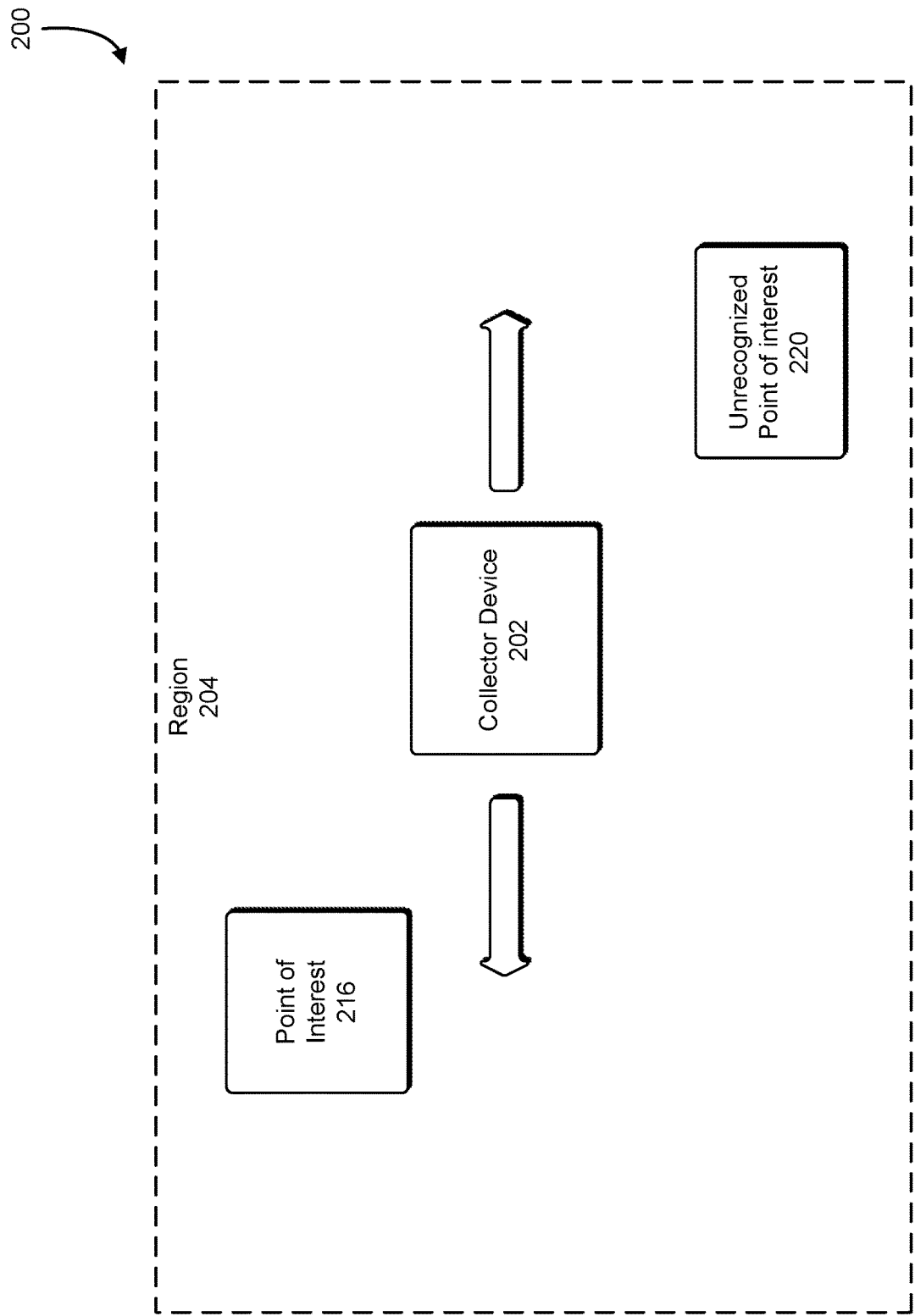
FIG. 2 illustrates further aspects of example operation of a sensor data collector device, in accordance with an embodiment.

FIG. 2 illustrates further aspects of example 200 of operation of a collector device, in accordance with an embodiment. The collector device 202 depicted in FIG. 2 may correspond to the collector device depicted in FIG. 1. As described in relation to FIG. 1, a collector device, such as the collector device 202 depicted in FIG. 2, can collects information in a region 204 at a point of interest 216. However, in addition to the point of interest 216, there may be other, as of yet unrecognized, points of interests, such as the unrecognized point of interest 220 depicted in FIG. 2.

In at least one embodiment, as collector device 202 is moved within region 204, it may collect data usable to determine that an unrecognized point of interest 220 should be noted for further study. For example, in at least one embodiment, a collector device 202 is used to study a coral reef that is undergoing coral bleaching at a recognized point 216. However, while being transported to or from that point 216, additional sensor data may be collected and analyzed to determine that an unrecognized point of interest 220 is, or is about to, undergo coral bleaching. Once recognized, this point 220 can then be a target for further study.

In at least one embodiment, a collector device routinely collects data known to be indicative of potential points of interest. For example, in a coral reef environment, sensor data indicative of temperature, salinity, and pollution might be collected during transport of collector device 202. In at least one embodiment, data is analyzed during transport of the collector device 202. The analysis can be performed, in at least one embodiment, by an artificial intelligence module in the device 202 to determine if the data is indicative of a potential point of interest. In other embodiments, the data is analyzed by a host system when the collector device 202 is returned to an area with network connectivity and has uploaded its data. In at least one embodiment, the host system analyzes data from a plurality of collector devices to determine whether they indicate that an additional point of interest should be studied further.

In at least one embodiment, data collected during transport is stored with metadata to indicate where and when the data was collected, in order to facilitate a subsequent determination regarding the location of a point of interest. The collector device 202 may comprise a GPS receiver to obtain location data for this purpose.

In at least one embodiment, data of unknown relevance is locally processed to identify key aspects, but is not stored entirely. For example, an object or feature, such as a footprint, might be observed by the collector device 202. Rather than store an image of the object or feature, an artificial intelligence module of the collector device 202 might classify the object or feature, and store a record indicating what the object or feature was, and where and when it was noted. If the object or feature is later determined to be relevant, it can be re-located using this data. Using this approach may be used to save storage space on the device. In at least one embodiment, the artificial intelligence module determines, based on a classification of the information, whether or not the original data should be stored. In at least one embodiment, the determination is based on an amount of storage currently available to the device 202.

In at least one embodiment, the collector device 202 identifies a previously unrecognized point of interest 220 and responds to the identification by initiating further data collection. In at least one embodiment, this comprises the collection of additional sensor data while the collector device 202 is in the vicinity of the new point of interest 220. Note that because the collector device 202 may be in motion during this period, because it was being transported from the original point of interest 216 to some other location, the period of additional data collection may last until the collector device 202 is no longer in the vicinity of the new point of interest 220.

Figure 3:
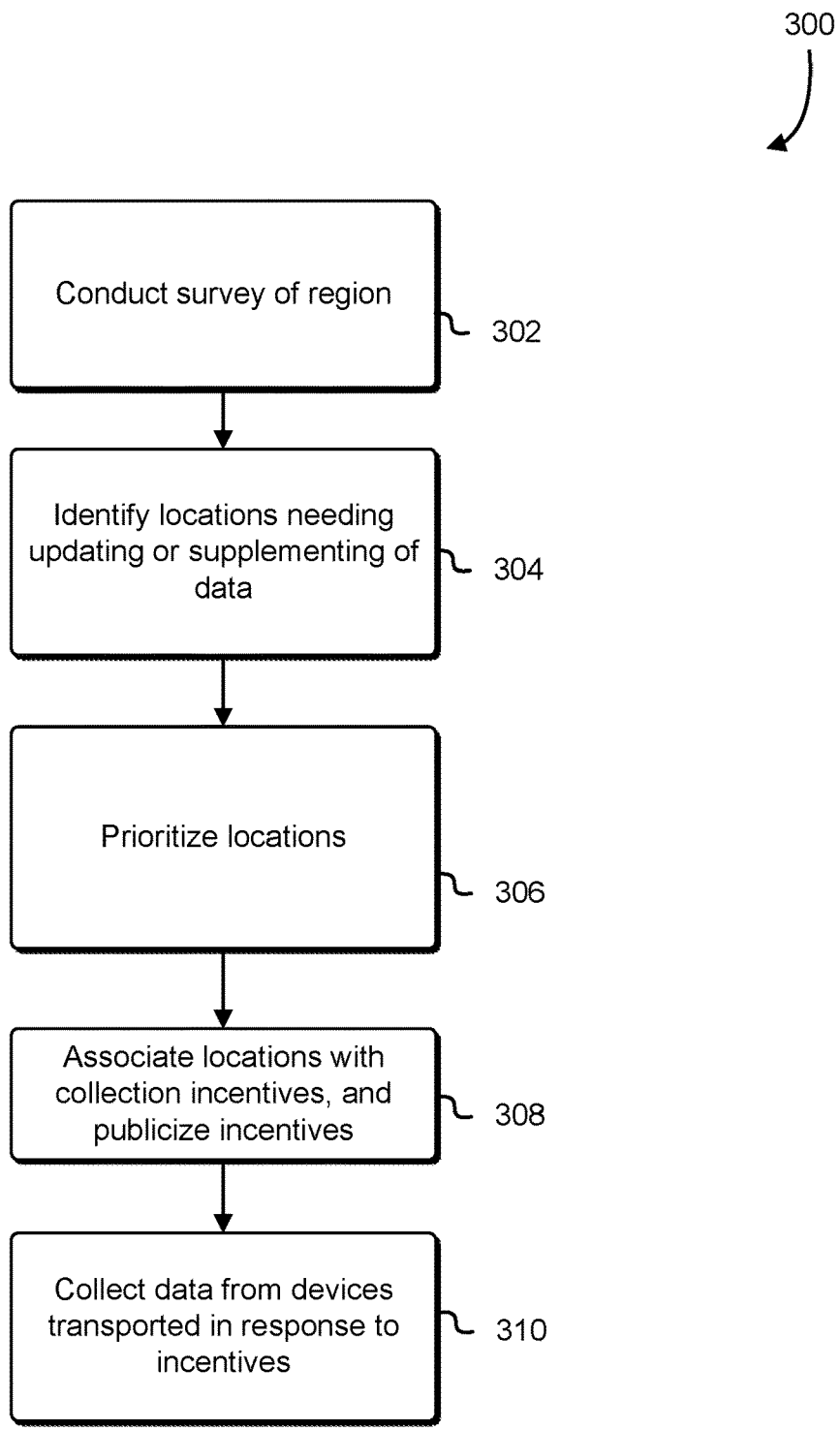
FIG. 3 illustrates an example process for facilitating transport of collector devices, in accordance with an embodiment.

FIG. 3 illustrates an example process for facilitating transport of collector devices, in accordance with an embodiment. In particular, the example 300 depicts a process for enhancing the collection of sensor data using prioritization and incentives to promote visitors to points of interest to assist in the transportation of collector devices.

In an embodiment, at 302, a survey of a region is conducted. For example, a survey of an area might be conducted to determine the primary features of an area, locations within the area that might be of concern, plant or animal species that may inhabit the area, and so forth. In some cases, environmental trends and conditions might be noted, such as temperature and pollutant levels. Note, however, that it may be difficult to do a thorough survey of such areas, and that data collected during an initial surface may become inaccurate over time. Accordingly, steps described in relation to FIG. 3 may be performed to supplement or update data obtained during an initial survey.

At 304, locations needing updating or supplementing are identified. These may be locations within the region for which data has become out of date, or for which no data was ever acquired. In some instances, it may be determined that a type of data that was not previously collected is now desired.

In at least one embodiment, the region to be surveyed is divided into regions, and each region is analyzed to identify sub-regions for which data collection should be prioritized. Sub-division of the region may be based on a variety of factors. In at least one embodiment, a region is subdivided based, at least in part, on a conservation goal, such as species preservation. For example, an area that is believed to be a habitat for an endangered species might be identified as a sub-region. In at least one embodiment, a region is subdivided based, at least in part, on visitor traffic patterns. For example, if visitors in a region tend to visit one of four locations, four sub-regions might be identified to each correspond to one of the four locations. In at least one embodiment, a region is sub-divided based on completeness or accuracy of data. For example, in at least one embodiment, an area with relatively new and complete data is identified as a first sub-region, and an area with out of data or incomplete data is identified as a second sub-region. In at least one embodiment, one or more of the preceding factors are used to identify sub-regions.

At 306, the sub-regions are prioritized. For example, sub-regions that are missing data, have out-of-date data, or which are known to be undergoing rapid environmental change, may be assigned high priority. Similarly, stable areas, or areas with data that is recent and complete, may be assigned low priority.

At 308, the prioritization is used to associate sub-regions with incentives to collect sensor data. In at least one embodiment, sub-regions with high priority are assigned greater incentives than sub-regions with low priority.

In at least one embodiment, an incentive system is based, at least in part, on ranking visitor contributions. In this incentive system, visitors may receive points or awards whose magnitude or value is proportional to the priority of a sub-region. The points or awards are assigned to the visitor when the visitor assists in the transportation of a collector device to or from the sub-region.

In at least one embodiment, an incentive system is based, at least in part, on publication of information indicative a visitor's assistance in transporting a collector device. For example, a social media posting may be made to indicate the visitor's accomplishment. The type or visibility of the publication may be adjusted based on the priority of the sub-region, so that transporting collector devices to or from high-priority sub-regions results in a social media posting with greater visibility than transporting collector devices to or from a low-priority sub-region.

In at least one embodiment, monetary awards or gifts are provided to a visitor based, at least in part, on the visitor's assistance in transporting a collector device to or from a sub-region. The magnitude of the gift may be based, at least in part, on the priority of the relevant sub-region.

In at least one embodiment, an association between a sub-region and an incentive is publicized, so that potential visitors can become aware of the incentive. In at least one embodiment, publication is through a web site, email, text message, or other communication that is received and viewed by a potential visitor while they are away from the region or sub-region. In other embodiments, the incentive is publicized by communication between a device that is in the region, and that can communicate with the potential visitor's device using a local wireless network or point-to-point communication. In at least one embodiment, the device is a server located in the region. In other embodiments, a collector device communicates with the potential visitor's device to publicize an incentive, using a local wireless network or point-to-point communication. In these embodiments, a local wireless network or point-to-point communication is used due to the lack of availability of other networks in the region, or due to communication with such networks being infeasible. When a server or collector device communicates with a potential visitor's device, it can be via one or more of web-based interaction, email, text message, or other communications method.

In at least one embodiment, the potential visitor indicates acceptance of the data collection task by communicating with the server or other device. In response to the acceptance, the server or other device that is publicizing incentives can tune its collection activities to focus on incentivizing transport of other collector device.

A potential visitor may travel to the region and, in particular, to the location of a collector device. In at least one embodiment, the location corresponds to the location of the collector device whose transport was incentivized and that the visitor has agreed to collect. The visitor may then take the device and transport it out of the region.

In at least one embodiment, at 310, data is collected from the collector devices that have been transported in response to the incentives. Once transported, data from the collector device can be uploaded. In at least one embodiment, when collector device's data has been uploaded, the collection task is marked as complete. When marked complete, in at least one embodiment, incentives to travel to the collector device's former sub-region are adjusted accordingly. For example, in at least one embodiment, the priority of data collection for the sub-region is lowered.

In an embodiment, the system leverages knowledge of a potential visitor's plans or intentions in order to facilitate data collection. For example, the system might receive a notification that a potential visitors intends to travel to a location, and respond by notifying the potential visitor of relevant data collection opportunities. In at least one embodiment, the system correlates intended travel plans to regions or sub-regions with collection tasks, and publicizes collection incentives to potential visitors to regions or sub-regions that have pending tasks to retrieve or deposit collector devices.

Figure 4:
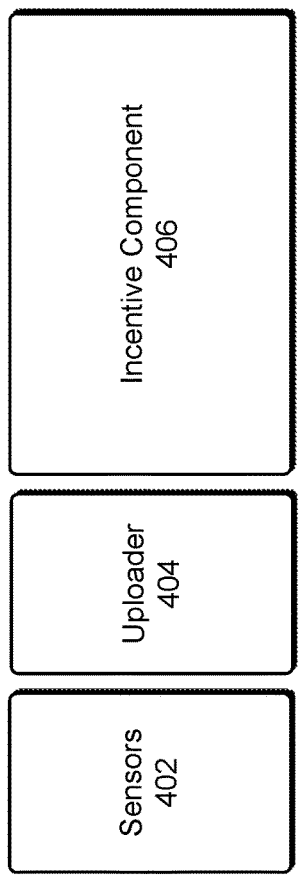
FIG. 4 illustrates an example of a device for incentivizing data collection, in accordance with an embodiment.

FIG. 4 illustrates an example of a collector device which includes components for incentivizing data collection, in accordance with an embodiment. In at least one embodiment, as depicted by FIG. 4, a collector device 400 may include a component whose inclusion in the collector device incentivizes its transport.

In at least one embodiment, a collector device 400 comprises one or more sensors 402 for collecting environmental data. The collector device 400 further comprises an uploader component 404, which comprises software and/or circuitry to upload collected sensor data when the collector device 400 has been transported to a suitable location, or is otherwise enabled for uploading. The collector device 400 further comprises an incentive component 406, which refers to some aspect of the device 400 that is useful, interesting, or otherwise operative to provide an incentive for someone to pick up the device, transport it to a suitable location, and allow or enable the uploader component 404 to upload collected data to a host system. In at least one embodiment, the collector device 400 corresponds to the collector devices 102, 202 depicted in FIGS. 1 and 2.

The collector device 400 may be transported to a remote region from which sensor data is desired. In some cases, the transportation to the region is performed by the entity associated with a host system, i.e., the entity that wishes to collect and analyze the sensor data. In other cases, the transportation may be performed by visitors to the region, possibly based on the incentive system described in relation to FIG. 3.

In the example of FIG. 4, transportation of the collector device 400 from the remote region to another location, where collected data can be uploaded, is facilitated by incentive component 406. The incentive component 406 is included as a component of the device 400 in order to encourage the device to be collected by a visitor to the remote location, transported to a suitable location, and allowed or enabled to upload data.

In at least one embodiment, the incentive component 406 performs a useful function. Examples include, but are not necessarily limited to, operating as a flashlight, compass, GPS receiver, or camera. In at least one embodiment, the incentive component 406 includes a display or audio speaker, through which information about the region is provided to the visitor.

In at least one embodiment, the incentive component 406 performs a sentimental or ornamental function. Examples include, but are not necessarily limited to, including ornamentation or decoration that relates to the region being visited, or that appears as an award or trophy. In at least one embodiment, the incentive component 406 comprises the exterior of the collector device. For example, the sensors 402 and uploaded component 404 may be encased within incentive component 406. Thus, in one or more embodiments, the collector device 400 appears as a coin, trophy, compass, flashlight, and so forth. In some cases, the collector device has an exterior resembling a plant or animal that is related to the region, such as a fish or sea anemone for an aquatic region, or a polar bear for an arctic region.

In at least one embodiment, the collector device 400 comprises markings or a mechanism for providing instructions. In at least one embodiment, this comprises markings that indicate that the visitor is encouraged to pick up and take the device. In at least one embodiment, the collector device comprises a display or audio speaker which provides visual or audio instructions. The instructions can include guidance regarding where the device should be transported, and how uploading of the data can be enabled.

In at least one embodiment, the collector device 400 automatically uploads data when transported to a suitable location, such as a location with communication to a host server available via cellular or WiFi.

In at least one embodiment, the visitor connects the collector device 400 is to a computing device, such as a personal computer or smartphone, and initiates a process for uploading the environmental data obtained and stored by the collector device 400.

Figure 5:
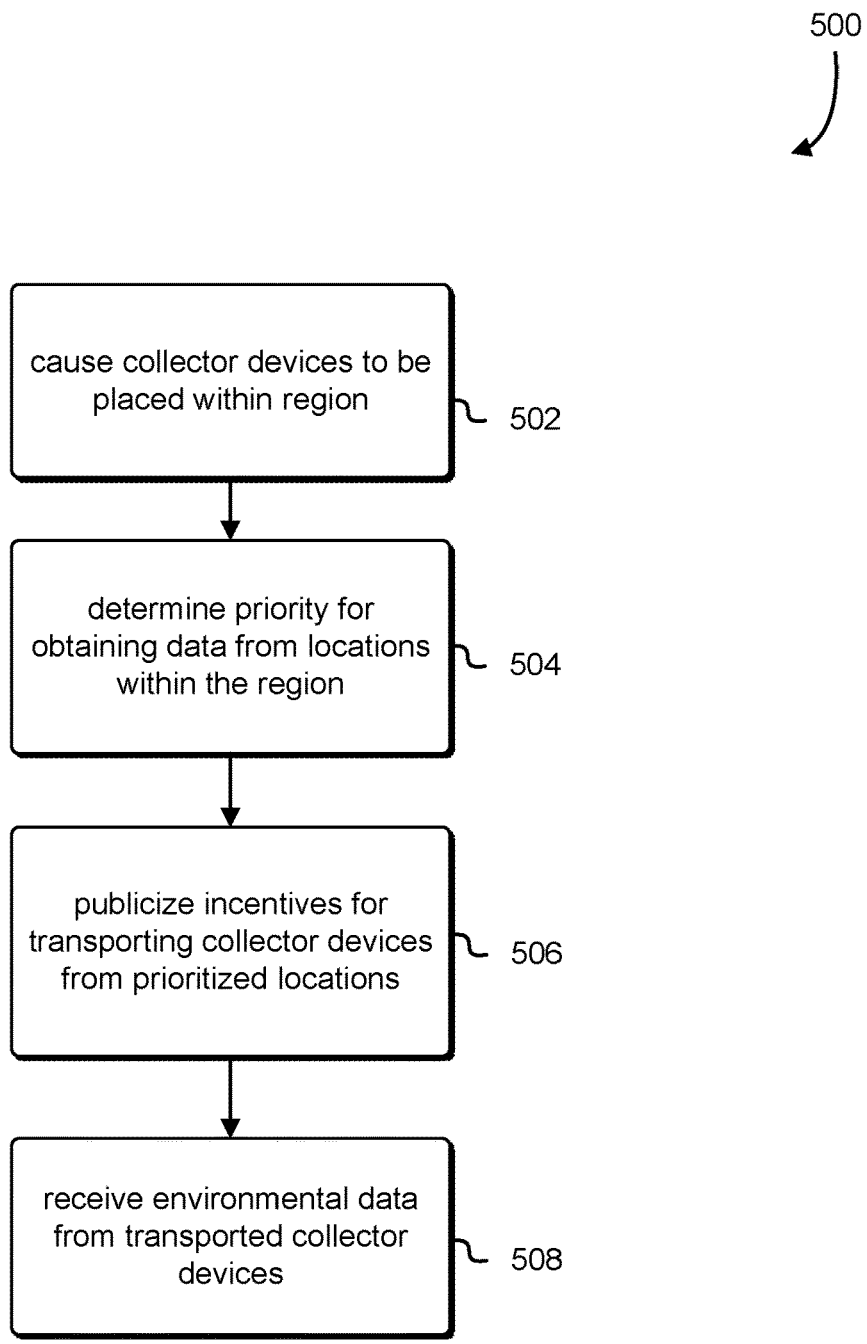
FIG. 5 illustrates an example process of collecting environmental data from a remote location, in accordance with an embodiment.

FIG. 5 illustrates an example process of collecting environmental data from a remote location, in accordance with an embodiment. Some or all of the process 500 (or any other processes described, or variations and/or combinations of those processes) may be performed at least partially under the control of one or more computer systems configured with executable instructions and/or other data, and may be implemented as executable instructions executing collectively on one or more processors. The executable instructions and/or other data may be stored on a non-transitory computer-readable storage medium, e.g., a computer program persistently stored on magnetic, optical, or flash media.

At 502, collector devices are caused to be placed within a region. As described herein, the region may be remote or otherwise difficult to access. Further, network communication may not be possible or practical within the region. For example, the region may lack cellular or wireless communications infrastructure, or such communications may not be practical due to the region being underwater, or due to network communications requiring excessive power utilization.

In at least one embodiment, collector devices are manually distributed to various locations within the region.

In at least one embodiment, an incentive is published to encourage visitors or potential visitors to a region to assist in the distribution of collector devices. In at least one embodiment, a collector device comprises a component for indicating when it is in a suitable location within the region. In at least one embodiment, a collector device comprises a component for assisting navigation to a location that is suitable. Once at the location, the visitor may leave the device.

At 504, a priority for obtaining environmental data, from locations within the region, is determined. As described herein, a region may be subdivided and data collected for the sub-regions analyzed to determine a priority for future data collection.

In at least one embodiment, locations in sub-regions with no previously collected data are prioritized over locations in sub-regions that have previously collected data.

In at least one embodiment, locations in sub-regions with older previously collected data are prioritized over locations in sub-regions with newly data.

In at least one embodiment, locations suitable for collecting data that pertains to an event are prioritized over locations not suitable for collecting data relevant to the event. In at least one embodiment, the event comprises one or more of a change to environmental conditions, a change to weather conditions, or suspected animal poaching.

At 506, incentives for transporting collector devices are publicized. As described herein, publicizing an incentive can comprise one or more of email, text, or web-based communications. In at least one embodiment, the communications are directed to individuals or groups believed to comprise likely visitors to the region being surveyed. In at least one embodiment, the incentive is based on a determined priority. In at least one embodiment, the value or magnitude of the incentive is adjusted according to the priority, so that the incentive associated with a higher-priority location is greater than the incentive associated with a lower-priority location.

At 508, environmental data is received from a transported collector device. In at least one embodiment, the collector device is picked up and transported from its location within the region, by a visitor who was incentivized to do so according to the incentive described at 506. In at least one embodiment, the collector device is transported from the region to another location that has network connectivity. In at least one embodiment, the collector device determines that it is has been transported to a location with network connectivity, and then proceeds to upload its collected environmental data to a host system.

In at least one embodiment, the collector device comprises wireless or cellular communications circuitry that is able to detect the presence of a corresponding wireless or cellular network, and to react to the detected presence by connecting to a host system and uploading the collected environmental data.

In at least one embodiment, the collector device comprises an inertial sensor, or other movement sensor. The collector device can use these sensors to detect movement, and then respond to the detected movement by activating a wireless or cellular network and attempting to upload the obtained environmental data to a host system. In at least one embodiment, the communications attempt is made in response to the magnitude of movement. For example, the collector device may attempt to communicate with a host system when it determines that the device appears to have been transported outside of the region. Use of this technique may help to preserve battery power in the device.

In at least one embodiment, the collector device comprises a sensor or receiver for determining the collector device's present location. The sensor or receiver may be used in a manner similar to the movement sensors just described.

In at least one embodiment, the individual who transported the device initiates the upload through a procedure involving at least some manual steps, such as pushing a button on the collector device, or connecting the collector device to a computer.

In at least one embodiment, networking components in a collector device are activated when a button or switch on the collector device is activated. Once the networking components are activated, the collector device may attempt to communicate with a host system and upload the collected environmental data.

In at least one embodiment, a collector device is connected to a visitors computing device, and an upload procedure is triggered in response to the connection.

In at least one embodiment, a collector device has, on its exterior, an imprinting or other markings to providing instructions for using the device. These may comprise instructions for verifying the identity the device, instructions for transporting the device, and instructions for activating the upload process.

In at least one embodiment, a process for uploading environmental data comprises the collector device detecting that it has been transported, the collector device confirming that it is now located where there is cellular or wireless connectivity, verification that the collector device can communicate with a host system, and transfer of collected environmental data.

In at least one embodiment, a process for uploading environmental data comprises the collector device being activated by a use of a button or switch on the device, the collector device confirming that it is now located where there is cellular or wireless connectivity, verification that the collector device can communicate with a host system, and transfer of collected environmental data.

In at least one embodiment, a host system comprises a server or other computing device or service that is associated with an entity that is collecting environmental data. In at least one embodiment, the host system stores and analyzes the received environmental data. In at least one embodiment, the host system prioritizes locations for data collection and publicizes incentives for transporting or retrieving collector devices to or from those locations.

In at least one embodiment, a method for obtaining environmental data comprises causing a plurality of collector devices to be placed within a region whose environment is to be monitored. The collector devices can be placed by direct action, e.g., by the entity that wishes to collect the environmental data, or by indirect action. For example, an incentive mechanism can be used to incentivize visitors to a region to distribute the devices on behalf of the entity. The collector devices comprise at least one sensor and a storage device. When placed at a destination location within the region, the collector devices collect environmental data and store's it one the storage device.

In at least one embodiment, the method further comprises determining a priority for obtaining environmental data from the location of the collector device. Priority may be determined based on one or more of a variety of criteria, as described herein.

In at least one embodiment, an incentive to transport the device from its location in the region is generated. In at least one embodiment, the incentive is based on, e.g., in response to or proportional to, the determined priority. In at least one embodiment, the method further comprises sending information indicative of the incentive to a party that may be in a position to transport the device, such as to a potential visitor to the region.

In at least one embodiment, the method further comprises receiving the environmental data at a host system. The environmental data is sent, in at least one embodiments, when the collector device is transported by an incentivized party to a location where there is connectivity to the host system.

In at least one embodiment, the collector device comprises a mechanism for user activation of network communication by the collector device. For example, the collector device may comprise a button or switch that can be activated to enable a cellular or WiFi connection, or a universal serial bus ("USB") connector that can be attached to the transporting party's computing device.

In at least one embodiment, the method further comprises determining, based on a sensor such as a positioning sensor or and inertial sensor, that the collector device has been transported. The sensor can be included in the device along with sensors to collect environmental data, and can be used to detect movement of a magnitude sufficient to potentially bring the device within range of a cellular tower or other network infrastructure. If the device detects such movement, it can respond by activating network communication and attempting to contact a host system.

In at least one embodiment, the method further comprises determining a priority for obtaining the environmental data based, at least in part, on environmental data previously collected proximate, e.g., nearby, to the location. If data has recently been collected from a nearby location, the priority for data collection may be low. On the other hand, if data has not been recently collected from a nearby location, the priority for data collection may be high.

In at least one embodiment, the collector device comprises an ornamental feature to incentivize transportation of the collector device. Examples are described herein, and as noted, can include features such as graphical or ornamental designs indicative of a plant or creature native to the region, or some other feature. In at least one embodiment, the collector device is shaped like such a plant or creature, and this exterior constitutes an ornamental feature.

In at least one embodiment, the collector device comprises a component to incentivize transportation of the collector device, where this component is capable of performing a function, independent of collection of environmental data, to incentivize transport of the collector device. For example, the collector device might function as a flashlight, fitness tracker, keychain, and so forth. These examples are intended to be illustrative, and as such should not be construed so as to limit the scope of the present disclosure to only those embodiments that include the specific examples provided.

In at least one embodiment, the collector device comprises a component to assist in locating the collector device. Because collector devices may be left in place for some time prior to being collected, they may become difficult to find. Accordingly, a collector device may comprise a mechanism to facilitate location. For example, a collector device might include a brightly colored component, to enable easier visual location. Likewise, the collector device might include a radio frequency identification ("RFID") device that can react when an RFID reader device is nearby.

In at least one embodiment, a collector device comprises a sensor to collect environmental data, and a storage device to store the collected environmental data. The collector device further comprises at least one processor, and a memory comprising instructions that, in response to execution by the at least one processor, cause the collector device to at least obtain environmental data from the sensor and store the environmental data collected on the storage device, wherein the environmental data is collected while the collector device is located at a location within a region whose environment is to be monitored; determine that the collector device has been transported from the location to another location with network connectivity to a host system; and transmit the environmental data to a host system, in response to the determination that the collector device has been transported.

In at least one embodiment, the collector device comprises a mechanism, such as a button, switch, or connector, to enable manual activation of network communication by the collector device.

In at least one embodiment, the memory of the collector device comprises instructions that, in response to execution by the at least one processor, cause the collector device to at least determine, based at least in part on at least one of a positioning sensor or inertial sensor in the collector device, that the collector device has been transported; and activate network communication by the collector device in response to the determination that the collector device has been transported.

In at least one embodiment, the collector device comprises an ornamental feature to incentivize transportation of the collector device.

In at least one embodiment, the collector device comprises a component to incentivize transportation of the collector device, by performing a function, independent of collection of environmental data, to incentivize transport of the collector device.

In at least one embodiment, the memory of the collector device comprises instructions that, in response to execution by the at least one processor, cause the collector device to at least determine, based at least in part on the obtained environmental data, to collect one or more additional types of environmental data while the collector device is at the location. For example, as described herein, an artificial intelligence module included in the collector device may analyze the collected data and determine that an event has occurred. Further, the device may determine, in response to the event, to collect additional types of data, or to change the frequency of data collection.

In at least one embodiment, the memory of the collector device comprises instructions that, in response to execution by the at least one processor, cause the collector device to at least initiate communication with a computing device proximate to the collector device at the location; and obtain additional environmental data based on the communication.

In at least one embodiment, a non-transitory computer-readable storage medium comprises instructions that, when executed by at least one processor of a computing device, cause the computing device to at least obtain environmental data from a sensor of the computing device, the environmental data obtained while the computing device is located at a location within a region whose environment is to be monitored; store the environmental data on a storage device of the computing device; determine that the computing device has been transported from the location to another location with network connectivity to a host system; and transmit the environmental data to the host system, in response to the determination that the computing device has been transported.

Embodiments of the present disclosure may be further understood in view of the following clauses:

1. A method for obtaining environmental data, the method comprising:
   causing a plurality of collector devices to be placed within a region, wherein a collector device, of the plurality of collector devices, comprises a sensor and a storage device, wherein the collector device, when placed at a location within the region, collects and stores the environmental data;
   determining a priority for obtaining environmental data from the location of the collector device;
   sending information indicative of an incentive to transport the collector device from the location to another location with network connectivity, the incentive sent based at least in part on the priority; and
   receiving, by a host system, the environmental data, wherein the environmental data is sent from the collector device to the host system in response to the collector device being transported by an incentivized party to a location where there is connectivity to the host system.

2. The method of clause 1, wherein the collector device comprises a mechanism for user activation of network communication by the collector device.

3. The method of any of clauses 1-2, further comprising:
   determining, based at least in part on at least one of a positioning sensor or inertial sensor in the collector device, that the collector device has been transported; and
   activating network communication by the collector device in response to the determination that the collector device has been transported.

4. The method of any of clauses 1-3, further comprising:
   determining the priority for obtaining the environmental data based, at least in part, on environmental data previously collected proximate to the location.

5. The method of any of clauses 1-4, wherein the collector device comprises an ornamental feature to incentivize transportation of the collector device.

6. The method of any of clauses 1-5, wherein the collector device comprises a component to incentivize transportation of the collector device, the component capable of performing a function, independent of collection of environmental data, to incentivize transport of the collector device.

7. The method of any of clauses 1-6, wherein the collector device comprises a component to assist in locating the collector device.

8. A collector device, comprising:
   a sensor to collect environmental data;
   a storage device to store the collected environmental data;
   at least one processor;
   a memory comprising instructions that, in response to execution by the at least one processor, cause the collector device to at least:
     obtain environmental data from the sensor and store the environmental data collected on the storage device, wherein the environmental data is collected while the collector device is located at a location within a region whose environment is to be monitored;
     determine that the collector device has been transported from the location to another location with network connectivity to a host system; and
     transmit the environmental data to a host system, in response to the determination that the collector device has been transported.

9. The collector device of clause 8, further comprising a mechanism for manual activation of network communication by the collector device.

10. The collector device of any of clauses 8-9, the memory comprising instructions that, in response to execution by the at least one processor, cause the collector device to at least:

determine, based at least in part on at least one of a positioning sensor or inertial sensor in the collector device, that the collector device has been transported; and activate network communication by the collector device in response to the determination that the collector device has been transported.

11. The collector device of any of clauses 8-10, further comprising an ornamental feature to incentivize transportation of the collector device.

12. The collector device of any of clauses 8-11, further comprising a component to incentivize transportation of the collector device, the component capable of performing a function, independent of collection of environmental data, to incentivize transport of the collector device.

13. The collector device of any of clauses 8-12, the memory comprising instructions that, in response to execution by the at least one processor, cause the collector device to at least:

determine, based at least in part on the obtained environmental data, to collect one or more additional types of environmental data while the collector device is at the location.

14. The collector device of any of clauses 8-13, the memory comprising instructions that, in response to execution by the at least one processor, cause the collector device to at least:

initiate communication with a computing device proximate to the collector device at the location; and obtain additional environmental data based on the communication.

15. A non-transitory computer-readable storage medium comprising instructions that, when executed by at least one processor of a computing device, cause the computing device to at least:

obtain environmental data from a sensor of the computing device, the environmental data obtained while the computing device is located at a location within a region whose environment is to be monitored;

store the environmental data on a storage device of the computing device;

determine that the computing device has been transported from the location to another location with network connectivity to a host system; and transmit the environmental data to the host system, in response to the determination that the computing device has been transported.

16. The non-transitory computer-readable storage medium of clause 15, comprising instructions that, when executed by at least one processor of a computing device, cause the computing device to at least:

determine, based at least in part on at least one of a positioning sensor or inertial sensor in the collector device, that the collector device has been transported; and activate network communication by the collector device in response to the determination that the collector device has been transported.

17. The non-transitory computer-readable storage medium of any of clauses 15-16, comprising instructions that, when executed by at least one processor of a computing device, cause the computing device to at least:

determine, based at least in part on the obtained environmental data, to collect one or more additional types of environmental data while the collector device is at the location.

18. The non-transitory computer-readable storage medium of clause 17, wherein the determination to collect one or more additional types of environmental data is based, at least in part, on application of an artificial intelligence algorithm to the obtained environmental data.

19. The non-transitory computer-readable storage medium of any of clauses 15-18, comprising instructions that, when executed by at least one processor of a computing device, cause the computing device to at least:

initiate communication with a computing device proximate to the collector device at the location; and obtain, from the communication, one or more additional types of environmental data.

20. The non-transitory computer-readable storage medium of clause 19, comprising instructions that, when executed by at least one processor of a computing device, cause the computing device to at least:

determine, based at least in part on analysis of an event, the one or more additional types of environmental data to obtain.

Figure 6:
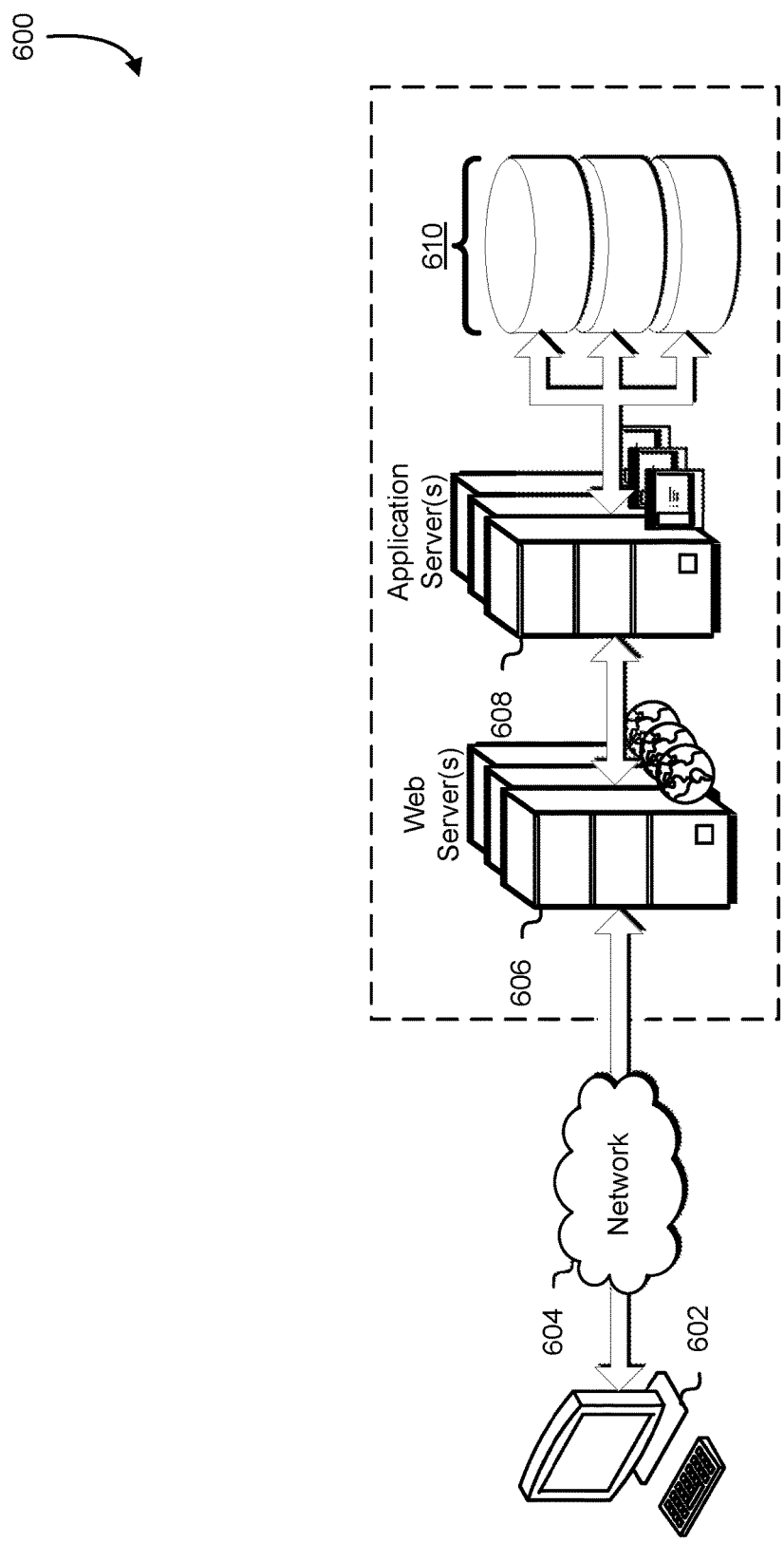
FIG. 6 illustrates an environment in which various embodiments can be implemented.

FIG. 6 illustrates aspects of an example environment 600 for implementing aspects in accordance with various embodiments. As will be appreciated, although a web-based environment is used for purposes of explanation, different environments may be used, as appropriate, to implement various embodiments. The environment includes an electronic client device 602, which can include any appropriate device operable to send and/or receive requests, messages, or information over an appropriate network 604 and convey information back to a user of the device. Examples of such client devices include personal computers, cell phones, handheld messaging devices, laptop computers, tablet computers, set-top boxes, personal data assistants, embedded computer systems, electronic book readers, and the like.

The environment 600 in one embodiment is a distributed and/or virtual computing environment utilizing several computer systems and components that are interconnected via communication links, using one or more computer networks or direct connections. However, it will be appreciated by those of ordinary skill in the art that such a system could operate equally well in a system having fewer or a greater number of components than those illustrated in FIG. 6. Thus, the depiction in FIG. 6 should be taken as being illustrative in nature and not limiting to the scope of the disclosure.

The network 604 can include any appropriate network, including an intranet, the Internet, a cellular network, a local area network, a satellite network or any other network, and/or combination thereof. Components used for such a system can depend at least in part upon the type of network and/or environment selected. Many protocols and components for communicating via such network 604 are well known and will not be discussed in detail. Communication over the network 604 can be enabled by wired or wireless connections and combinations thereof. In an embodiment, the network 604 includes the Internet and/or other publicly addressable communications network, as the environment 600 includes one or more web servers 606 for receiving requests and serving content in response thereto, although for other networks an alternative device serving a similar purpose could be used as would be apparent to one of ordinary skill in the art.

The illustrative environment 600 includes one or more application servers 608 and data storage 610. It should be understood that there can be several application servers, layers or other elements, processes or components, which may be chained or otherwise configured, which can interact to perform tasks such as obtaining data from an appropriate data store. Servers, as used, may be implemented in various ways, such as hardware devices or virtual computer systems. In some contexts, "servers" may refer to a programming module being executed on a computer system. As used, unless otherwise stated or clear from context, the term "data store" or "data storage" refers to any device or combination of devices capable of storing, accessing, and retrieving data, which may include any combination and number of data servers, databases, data storage devices, and data storage media, in any standard, distributed, virtual, or clustered environment.

The one or more application servers 608 can include any appropriate hardware, software and firmware for integrating with the data storage 610 as needed to execute aspects of one or more applications for the electronic client device 602, handling some or all of the data access and business logic for an application. The one or more application servers 608 may provide access control services in cooperation with the data storage 610 and is able to generate content including, text, graphics, audio, video, and/or other content usable to be provided to the user, which may be served to the user by the one or more web servers 606 in the form of HyperText Markup Language (HTML), Extensible Markup Language (XML), JavaScript, Cascading Style Sheets (CSS), JavaScript Object Notation (JSON), and/or another appropriate client-side structured language. Content transferred to the electronic client device 602 may be processed by the electronic client device 602 to provide the content in one or more forms including forms that are perceptible to the user audibly, visually, and/or through other senses. The handling of all requests and responses, as well as the delivery of content between the electronic client device 602 and the one or more application servers 608, can be handled by the one or more web servers 606 using PHP: Hypertext Preprocessor (PHP), Python, Ruby, Perl, Java, HTML, XML, JSON, and/or another appropriate server-side structured language in this example. Further, operations described as being performed by a single device may, unless otherwise clear from context, be performed collectively by multiple devices, which may form a distributed and/or virtual system.

Each server typically will include an operating system that provides executable program instructions for the general administration and operation of that server and typically will include a computer-readable storage medium (e.g., a hard disk, random access memory, read only memory, etc.) storing instructions that, when executed (i.e., as a result of being executed) by a processor of the server, allow the server to perform its intended functions.

The data storage 610 can include several separate data tables, databases, data documents, dynamic data storage schemes, and/or other data storage mechanisms and media for storing data relating to a particular aspect of the present disclosure. For example, the data storage 610 may include mechanisms for storing various types of data and user information, which can be used to serve content to the electronic client device 602. The data storage 610 also is shown to include a mechanism for storing log data, such as application logs, system logs, access logs, and/or various other event logs, which can be used for reporting, analysis, or other purposes. It should be understood that there can be many other aspects that may need to be stored in the data storage 610, such as page image information and access rights information, which can be stored in any of the above listed mechanisms as appropriate or in additional mechanisms in the data storage 610. The data storage 610 is operable, through logic associated therewith, to receive instructions from the one or more application servers 608 and obtain, update, or otherwise process data in response thereto. The one or more application servers 608 may provide static, dynamic, or a combination of static and dynamic data in response to the received instructions. Dynamic data, such as data used in web logs (blogs), shopping applications, news services, and other applications may be generated by server-side structured languages as described or may be provided by a content management system (CMS) operating on, or under the control of, the one or more application servers 608.

In one embodiment, a user, through a device operated by the user, can submit a search request for a match to a particular search term. In this embodiment, the data storage 610 might access the user information to verify the identity of the user and obtain information about items of that type. The information then can be returned to the user, such as in a results listing on a web page that the user is able to view via a browser on the electronic client device 602. Information related to the particular search term can be viewed in a dedicated page or window of the browser. It should be noted, however, that embodiments of the present disclosure are not necessarily limited to the context of web pages, but may be more generally applicable to processing requests in general, where the requests are not necessarily requests for content.

The various embodiments further can be implemented in a wide variety of operating environments, which in some embodiments can include one or more user computers, computing devices, or processing devices that can be used to operate any of a number of applications. User or client devices can include any of a number of computers, such as desktop, laptop, or tablet computers running a standard operating system, as well as cellular, wireless, and handheld devices running mobile software and capable of supporting a number of networking and messaging protocols. Such a system also can include a number of workstations running any of a variety of commercially available operating systems and other known applications for purposes such as development and database management. These devices also can include other electronic devices, such as dummy terminals, thin-clients, gaming systems, and other devices capable of communicating via the network 604. These devices also can include virtual devices such as virtual machines, hypervisors, and other virtual devices capable of communicating via the network 604.

Various embodiments of the present disclosure utilize the network 604 that would be familiar to those skilled in the art for supporting communications using any of a variety of commercially available protocols, such as Transmission Control Protocol/Internet Protocol (TCP/IP), User Datagram Protocol (UDP), protocols operating in various layers of the Open System Interconnection (OSI) model, File Transfer Protocol (FTP), Universal Plug and Play (UpnP), Network File System (NFS), and Common Internet File System (CIFS). The network 604 can be, for example, a local area network, a wide-area network, a virtual private network, the Internet, an intranet, an extranet, a public switched telephone network, an infrared network, a wireless network, a satellite network, and any combination thereof. In some embodiments, connection-oriented protocols may be used to communicate between network endpoints. Connection-oriented protocols (sometimes called connection-based protocols) are capable of transmitting data in an ordered stream. Connection-oriented protocols can be reliable or unreliable. For example, the TCP protocol is a reliable connection-oriented protocol. Asynchronous Transfer Mode (ATM) and Frame Relay are unreliable connection-oriented protocols. Connection-oriented protocols are in contrast to packet-oriented protocols such as UDP that transmit packets without a guaranteed ordering.

In embodiments utilizing the one or more web servers 606, the one or more web servers 606 can run any of a variety of server or mid-tier applications, including Hypertext Transfer Protocol (HTTP) servers, FTP servers, Common Gateway Interface (CGI) servers, data servers, Java servers, Apache servers, and business application servers. The server(s) also may be capable of executing programs or scripts in response to requests from user devices, such as by executing one or more web applications that may be implemented as one or more scripts or programs written in any programming language, such as JavaR, C, C# or C++, or any scripting language, such as Ruby, PHP, Perl, Python, or TCL, as well as combinations thereof. The server(s) may also include database servers, including those commercially available from Oracle®, Microsoft®, Sybase®, and IBM® as well as open-source servers such as MySQL, Postgres, SQLite, MongoDB, and any other server capable of storing, retrieving, and accessing structured or unstructured data. Database servers may include table-based servers, document-based servers, unstructured servers, relational servers, non-relational servers, or combinations of these and/or other database servers.

The environment 600 can include a variety of data stores and other memory and storage media as discussed above. These can reside in a variety of locations, such as on a storage medium local to (and/or resident in) one or more of the computers or remote from any or all of the computers across the network 604. In a particular set of embodiments, the information may reside in a storage-area network (SAN) familiar to those skilled in the art. Similarly, any necessary files for performing the functions attributed to the computers, servers or other network devices may be stored locally and/or remotely, as appropriate. Where a system includes computerized devices, each such device can include hardware elements that may be electrically coupled via a bus, the elements including, for example, a central processing unit (CPU or processor), an input device (e.g., a mouse, keyboard, controller, touch screen, or keypad), and an output device (e.g., a display device, printer, or speaker). Such a system may also include one or more storage devices, such as disk drives, optical storage devices, and solid-state storage devices such as random access memory (RAM) or read-only memory (ROM), as well as removable media devices, memory cards, flash cards, etc.

Such devices also can include a computer-readable storage media reader, a communications device (e.g., a modem, a network card (wireless or wired), an infrared communication device, etc.), and working memory as described above. The computer-readable storage media reader can be connected with, or configured to receive, a computer-readable storage medium, representing remote, local, fixed, and/or removable storage devices as well as storage media for temporarily and/or more permanently containing, storing, transmitting, and retrieving computer-readable information. The system and various devices also typically will include a number of software applications, modules, services, or other elements located within a working memory device, including an operating system and application programs, such as a client application or web browser. In addition, customized hardware might also be used and/or particular elements might be implemented in hardware, software (including portable software, such as applets), or both. Further, connection to other computing devices such as network input/output devices may be employed.

Storage media and computer readable media for containing code, or portions of code, can include any appropriate media known or used in the art, including storage media and communication media, such as, volatile and non-volatile, removable and non-removable media implemented in any method or technology for storage and/or transmission of information such as computer readable instructions, data structures, program modules, or other data, including RAM, ROM, Electrically Erasable Programmable Read-Only Memory (EEPROM), flash memory or other memory technology, Compact Disc Read-Only Memory (CD-ROM), digital versatile disk (DVD), or other optical storage, magnetic cassettes, magnetic tape, magnetic disk storage, or other magnetic storage devices, or any other medium which can be used to store the desired information and which can be accessed by the system device. Based on the disclosure and teachings provided, a person of ordinary skill in the art will appreciate other ways and/or methods to implement the various embodiments.

The specification and drawings are, accordingly, to be regarded in an illustrative rather than a restrictive sense. However, it will be evident that various modifications and changes may be made thereunto without departing from the broader spirit and scope of the invention as set forth in the claims. Other variations are within the spirit of the present disclosure. Thus, while the disclosed techniques are susceptible to various modifications and alternative constructions, certain illustrated embodiments thereof are shown in the drawings and have been described above in detail. It should be understood, however, that there is no intention to limit the invention to the specific form or forms disclosed, but on the contrary, the intention is to cover all modifications, alternative constructions, and equivalents falling within the spirit and scope of the invention, as defined in the appended claims.

The use of the terms "a," "an," "the," and similar referents in the context of describing the disclosed embodiments (especially in the context of the following claims) are to be construed to cover both the singular and the plural, unless otherwise indicated or clearly contradicted by context. The terms "comprising," "having," "including," and "containing" are to be construed as open-ended terms (i.e., meaning "including, but not limited to,") unless otherwise noted. The term "connected," where unmodified and referring to physical connections, is to be construed as partly or wholly contained within, attached to, or joined together, even if there is something intervening. Recitation of ranges of values are merely intended to serve as a shorthand method of referring individually to each separate value falling within the range, unless otherwise indicated and each separate value is incorporated into the specification as if it were individually recited. The use of the term "set" (e.g., "a set of items") or "subset" unless otherwise noted or contradicted by context, is to be construed as a nonempty collection comprising one or more members. Further, unless otherwise noted or contradicted by context, the term "subset" of a corresponding set does not necessarily denote a proper subset of the corresponding set, but the subset and the corresponding set may be equal. The use of the phrase "based on," unless otherwise explicitly stated or clear from context, means "based at least in part on" and is not limited to "based solely on."

Conjunctive language, such as phrases of the form "at least one of A, B, and C," or "at least one of A, B and C," is understood with the context as used in general to present that an item, term, etc., may be either A or B or C, or any nonempty subset of the set of A and B and C, unless specifically stated otherwise or otherwise clearly contradicted by context. For instance, in the illustrative example of a set having three members, the conjunctive phrases "at least one of A, B, and C" and "at least one of A, B and C" refer to any of the following sets: {A}, {B}, {C}, {A, B}, {A, C}, {B, C}, {A, B, C}. Thus, such conjunctive language is not generally intended to imply that certain embodiments require at least one of A, at least one of B and at least one of C each to be present. In addition, unless otherwise noted or contradicted by context, the term "plurality" indicates a state of being plural (e.g., "a plurality of items" indicates multiple items). The number of items in a plurality is at least two, but can be more when so indicated either explicitly or by context.

Operations of processes described can be performed in any suitable order unless otherwise indicated or otherwise clearly contradicted by context. Processes described (or variations and/or combinations thereof) may be performed under the control of one or more computer systems configured with executable instructions and may be implemented as code (e.g., executable instructions, one or more computer programs or one or more applications) executing collectively on one or more processors, by hardware or combinations thereof. The code may be stored on a computer-readable storage medium, for example, in the form of a computer program comprising instructions executable by one or more processors. The computer-readable storage medium may be non-transitory. In some embodiments, the code is stored on a set of one or more non-transitory computer-readable storage media having stored thereon executable instructions that, when executed (i.e., as a result of being executed) by one or more processors of a computer system, cause the computer system to perform operations described herein. The set of non-transitory computer-readable storage media may comprise multiple non-transitory computer-readable storage media and one or more of individual non-transitory storage media of the multiple non-transitory computer-readable storage media may lack all of the code while the multiple non-transitory computer-readable storage media collectively store all of the code. Further, in some embodiments, the executable instructions are executed such that different instructions are executed by different processors. As an illustrative example, a non-transitory computer-readable storage medium may store instructions. A main CPU may execute some of the instructions and a graphics processor unit may execute other of the instructions. Generally, different components of a computer system may have separate processors and different processors may execute different subsets of the instructions.

Accordingly, in some embodiments, computer systems are configured to implement one or more services that singly or collectively perform operations of processes described herein. Such computer systems may, for instance, be configured with applicable hardware and/or software that enable the performance of the operations. Further, computer systems that implement various embodiments of the present disclosure may, in some embodiments, be single devices and, in other embodiments, be distributed computer systems comprising multiple devices that operate differently such that the distributed computer system performs the operations described and such that a single device may not perform all operations.

The use of any examples, or exemplary language (e.g., "such as") provided, is intended merely to better illuminate embodiments of the invention and does not pose a limitation on the scope of the invention unless otherwise claimed. No language in the specification should be construed as indicating any non-claimed element as essential to the practice of the invention.

Embodiments of this disclosure are described, including the best mode known to the inventors for carrying out the invention. Variations of those embodiments may become apparent to those of ordinary skill in the art upon reading the foregoing description. The inventors expect skilled artisans to employ such variations as appropriate and the inventors intend for embodiments of the present disclosure to be practiced otherwise than as specifically described. Accordingly, the scope of the present disclosure includes all modifications and equivalents of the subject matter recited in the claims appended hereto as permitted by applicable law. Moreover, although above-described elements may be described in the context of certain embodiments of the specification, unless stated otherwise or otherwise clear from context, these elements are not mutually exclusive to only those embodiments in which they are described; any combination of the above-described elements in all possible variations thereof is encompassed by the scope of the present disclosure unless otherwise indicated or otherwise clearly contradicted by context.

All references, including publications, patent applications, and patents, cited are hereby incorporated by reference to the same extent as if each reference were individually and specifically indicated to be incorporated by reference and were set forth in its entirety.

What is claimed is:

1. A method for obtaining environmental data, the method comprising:
   providing a plurality of collector devices to be placed within a region, wherein a collector device, of the plurality of collector devices, comprises an ornamentation associated with incentivizing a party, a sensor, and a storage device, wherein the collector device collects and stores the environmental data from a location within the region, wherein an exterior housing of the collector device is formed in a shape of the ornamentation that is designed to be related to the region being visited by the party;
   determining a priority for obtaining environmental data from the location within the region based at least in part on the region undergoing frequent environmental change;
   sending information indicative of an incentive to transport the collector device from the location to another location with network connectivity, the incentive sent based at least in part on the priority; and
   receiving, by a host system, the environmental data, wherein the environmental data is sent from the collector device to the host system in response to the collector device being transported by an incentivized party to a location where there is connectivity to the host system wherein the environmental data is sent based at least in part on a magnitude of movement of the collector device.

2. The method of claim 1, wherein the collector device comprises a mechanism for user activation of network communication by the collector device.

3. The method of claim 1, further comprising:
   determining, based at least in part on at least one of a positioning sensor or inertial sensor in the collector device, that the collector device has been transported; and activating network communication by the collector device in response to the determination that the collector device has been transported.

4. The method of claim 1, further comprising:
determining the priority for obtaining the environmental data based, at least in part, on environmental data previously collected proximate to the location.

5. The method of claim 1, wherein the collector device comprises an ornamental feature to incentivize transportation of the collector device.

6. The method of claim 1, wherein the collector device comprises a component to incentivize transportation of the collector device, the component capable of performing a function, independent of collection of environmental data, to incentivize transport of the collector device.

7. The method of claim 1, wherein the collector device comprises a component to assist in locating the collector device.

8. A collector device, comprising:
a sensor to collect environmental data;
a storage device to store the collected environmental data;
an ornamentation associated with incentivizing a party to transport the device, wherein an exterior housing of the collector device being formed in a shape of the ornamentation that is designed to be related to a region being visited by the party;
at least one processor; and
a memory comprising instructions that, in response to execution by the at least one processor, cause the collector device to at least:
obtain environmental data from the sensor and store the environmental data collected on the storage device, wherein the environmental data is collected while the collector device is located at a location within a region whose environment is to be monitored, wherein the environment is determined to be monitored based at least in part on the region undergoing rapid environmental change;
determine that the collector device has been transported from the location to another location with network connectivity to a host system, wherein the collector device determines that it has been transported based on a magnitude of movement of the collector device; and
transmit the environmental data to a host system, in response to the determination that the collector device has been transported.

9. The collector device of claim 8, further comprising a mechanism for manual activation of network communication by the collector device.

10. The collector device of claim 8, the memory comprising instructions that, in response to execution by the at least one processor, cause the collector device to at least:
determine, based at least in part on at least one of a positioning sensor or inertial sensor in the collector device, that the collector device has been transported; and
activate network communication by the collector device in response to the determination that the collector device has been transported.

11. The collector device of claim 8, further comprising an ornamental feature to incentivize transportation of the collector device.

12. The collector device of claim 8, further comprising a component to incentivize transportation of the collector device, the component capable of performing a function, independent of collection of environmental data, to incentivize transport of the collector device.

13. The collector device of claim 8, the memory comprising instructions that, in response to execution by the at least one processor, cause the collector device to at least:
determine, based at least in part on the obtained environmental data, to collect one or more additional types of environmental data while the collector device is at the location.

14. The collector device of claim 8, the memory comprising instructions that, in response to execution by the at least one processor, cause the collector device to at least:
initiate communication with a computing device proximate to the collector device at the location; and
obtain additional environmental data based on the communication.

15. A non-transitory computer-readable storage medium comprising instructions that, when executed by at least one processor of a computing device, cause the computing device to at least:
obtain environmental data from a sensor of the computing device, the environmental data obtained while the computing device is located at a location within a region whose environment is to be monitored, the computing device comprising an ornamentation to incentivize transportation of the computing device away from the region, the environment being monitored based at least in part on the region undergoing frequent environmental change, an exterior housing of the computing device is formed in a shape of the ornamentation relating to a feature of the region being visited by a visitor;
store the environmental data on a storage device of the computing device;
determine, based at least in part on a magnitude of movement of the computing device, that the computing device has been transported from the location to another location outside of the region with network connectivity to a host system; and
transmit the environmental data to the host system, in response to the determination that the computing device has been transported.

16. The non-transitory computer-readable storage medium of claim 15, comprising instructions that, when executed by at least one processor of a computing device, cause the computing device to at least:
determine, based at least in part on at least one of a positioning sensor or inertial sensor in the computing device, that the computing device has been transported; and
activate network communication by the collector device in response to the determination that the computing device has been transported.

17. The non-transitory computer-readable storage medium of claim 15, comprising instructions that, when executed by at least one processor of a computing device, cause the computing device to at least:
determine, based at least in part on the obtained environmental data, to collect one or more additional types of environmental data while the collector computing device is at the location.

18. The non-transitory computer-readable storage medium of claim 17, wherein the determination to collect one or more additional types of environmental data is based, at least in part, on application of an artificial intelligence algorithm to the obtained environmental data.

19. The non-transitory computer-readable storage medium of claim 15, comprising instructions that, when executed by at least one processor of a computing device, cause the computing device to at least:
- initiate communication with a computing device proximate to the computer device at the location; and
- obtain, from the communication, one or more additional types of environmental data.

20. The non-transitory computer-readable storage medium of claim 19, comprising instructions that, when executed by at least one processor of a computing device, cause the computing device to at least:
- determine, based at least in part on analysis of an event, the one or more additional types of environmental data to obtain.

* * * * *